2,825,852

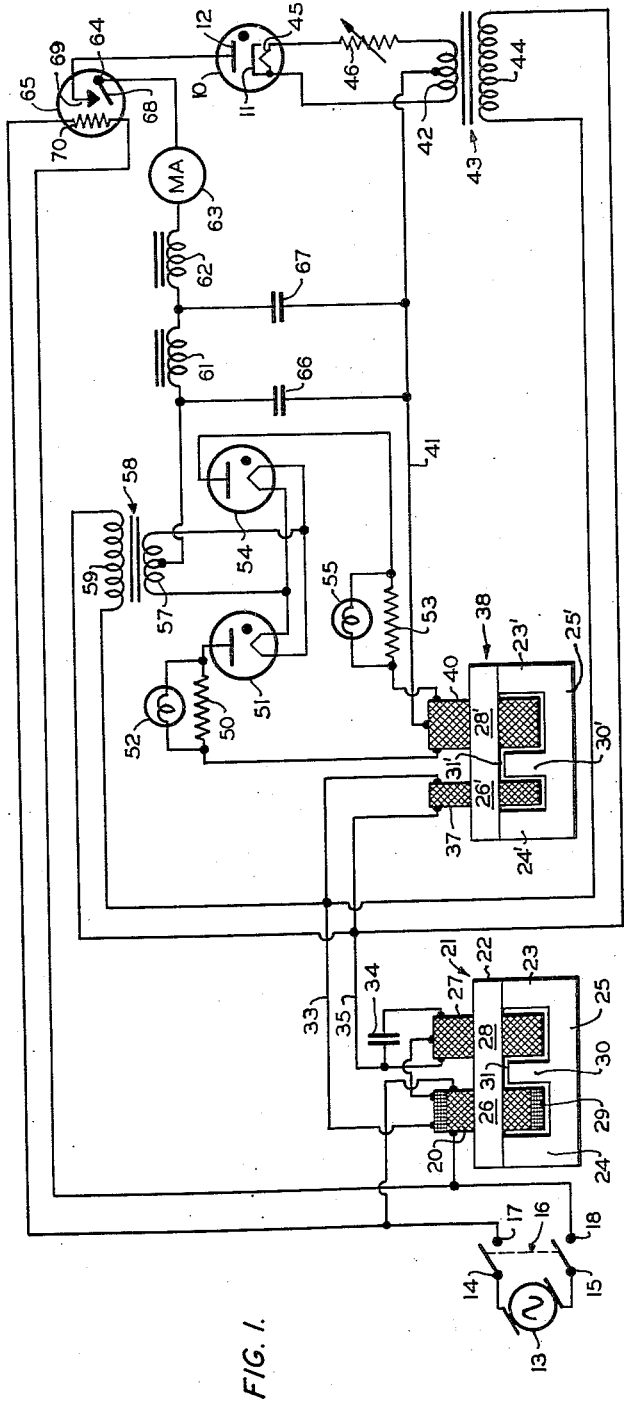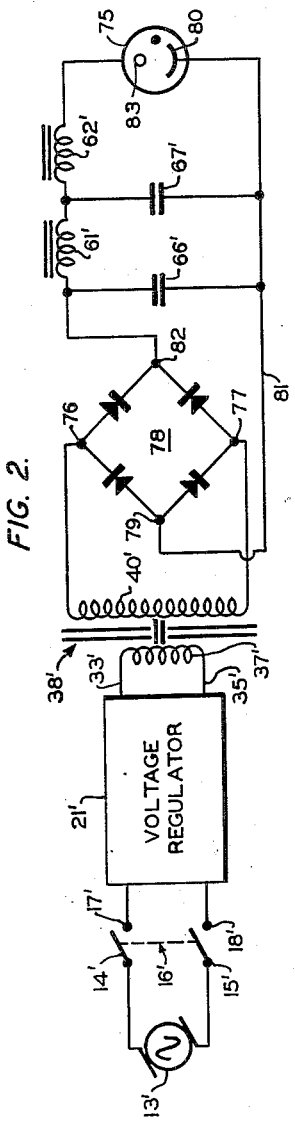
FIG. 1.
FIG. 2.
INVENTOR.
H. M. BARTON, JR.
BY Hudson & Young
ATTORNEYS United States Patent Office 2,825,852
Patented Mar. 4, 1958

RADIATION SOURCE

Hugh M. Barton, Jr., Bartlesville, Okla., assignor to Phillips Petroleum Company, a corporation of Delaware Application September 10, 1954, Serial No. 455,130

7 Claims. (Cl. 315—104)

This invention relates to apparatus for supplying electromagnetic radiation of constant intensity. In one specific aspect it relates to a spectrographic source to supply ultraviolet radiation for optical analysis instruments.

A large number of optical instruments has recently been developed for the analysis of sample streams in terms of the radiation absorption properties thereof. Included in these instruments are those analyzers which employ radiation in the ultraviolet spectrum. Such radiation is commonly produced by electrical discharge tubes filled with a gas such as hydrogen or xenon, for example. In most of these optical analyzers it is important that the radiation source be of constant intensity in order that fluctuations in the measured radiation be indicative solely of changes in radiation absorbed by the material being analyzed. This requires that a constant current be passed through the discharge tube to provide constant illumination. However, the constant current cannot be obtained from a conventional constant voltage source because the voltage required to fire the tube initially is of considerably greater magnitude than the voltage needed to sustain the discharge following the initial firing of the tube.

In accordance with the present invention there is provided an improved source of constant intensity electromagnetic radiation. This radiation is emitted from a gas filled electrical discharge tube which is energized by the passage of a constant direct current therethrough. The direct current is in turn derived from a source of alternating current. The input of a voltage regulator is connected to an alternating voltage source to provide an alternating voltage source of constant amplitude. The output of the voltage regulator is connected to the input winding of a saturable reactor type of current limiting voltage regulating transformer. The output alternating voltage from this transformer is rectified, filtered and applied across the discharge tube. The transformer has the property of saturating on short circuit, and thus limits the current supplied to the discharge tube. The voltage across the output terminals of this second transformer prior to the firing of the discharge tube is considerably higher than the voltage across the discharge tube when the tube is conducting.

Accordingly, it is an object of this invention to provide an improved source of constant intensity radiation for use with optical analysis instruments.

Another object is to provide apparatus to supply a constant direct current to a gas filled electrical discharge tube.

Various other objects, advantages and features of this invention should become apparent from the following detailed description taken in conjunction with the accompanying drawing in which:

Figure 1 is a schematic circuit diagram of a first embodiment of the radiation source of this invention; and Figure 2 is a schematic circuit diagram of a second embodiment of the radiation source.

Referring now to the drawing in detail and to Figure 1 in particular, there is shown a gas filled electrical discharge tube 10 of the heated cathode type. This tube can be filled with hydrogen or xenon, for example, so that radiation in the ultraviolet spectrum is emitted when an electrical discharge takes place between the cathode 11 and the anode 12 of tube 10.

The circuit of Figure 1 is energized from a voltage source 13 which can supply power at 115 volts, 60 cycles, for example. The output terminals of voltage source 13 are connected to the respective blades 14 and 15 of a switch 16. Blades 14 and 15 engage respective terminals 17 and 18 of switch 16 to supply power to the circuit associated with discharge tube 10. Switch terminals 17 and 18 are connected to the respective end terminals of the primary winding 20 of a constant voltage transformer 21, which can be of the type described in U. S. Patent 2,143,745. Transformer 21 is constructed of a stack of I shaped laminations 22 forming a core bar in abutting relation with the ends of legs 23 and 24 of a stack of E shaped laminations 25. Primary winding 20 is mounted on one end portion 26 of core bar 22. An output winding 27 is mounted on the second end portion 28 of core bar 22. An auxiliary winding 29 is positioned over winding 26 on portion 26 of bar 22. The center leg 30 of the E-shaped laminations 25 is spaced from bar 22 to form an air gap 31. One end terminal of auxiliary winding 29 is connected to the center tap of winding 27 and the second end terminal of auxiliary winding 29 is connected to a first output lead 33 of the transformer. A capacitor 34 is connected between the end terminals of winding 27. One end terminal of winding 27 is connected to the second output lead 35 of the transformer.

Leads 33 and 35 are connected to the respective end terminals of the primary winding 37 of a second transformer 38 which also is of the saturable reactor type. The physical structure of the core of transformer 38 is generally similar to that of transformer 21 and corresponding elements are designated by like primed reference numerals. The output winding 40 of transformer 38 is provided with a larger number of turns than input winding 37 to supply a high voltage output to fire discharge tube 10. Transformer 38 differs from transformer 21 in that the auxiliary winding 29 of transformer 21 is omitted.

The center tap of transformer winding 40 is connected to the center tap of the secondary winding 42 of a conventional transformer 43. The end terminals of the primary winding 44 of transformer 43 are connected to respective output leads 33 and 35 of voltage regulating transformer 21. One end terminal of the transformer winding 42 is connected to the cathode 11 of tube 10 and to one terminal of the filament 45 of tube 10. The second terminal of filament 45 is connected to the second end terminal of transformer winding 42 through a variable resistor 46. In this manner a constant voltage is applied to filament 45 to heat cathode 11.

One end terminal of winding 40 of transformer 38 is connected through a resistor 50 to the anode of a mercury vapor diode 51. An indicating lamp 52 is connected in shunt with resistor 50. The second end terminal of transformer winding 40 is connected through a resistor 53 to the anode of a second mercury vapor diode 54. An indicating lamp 55 is connected in shunt with resistor 53. Lamps 52 and 55 indicate that diodes 51 and 54 are operating. The filaments of diodes 51 and 54 are connected across the end terminals of the secondary winding 57 of a conventional transformer 58.

The end terminals of the primary winding 59 of transformer 58 are connected to respective leads 33 and 35. The center tap of transformer winding 57 is connected through a pair of series connected inductors 61 and 62 and a milliammeter 63 to a terminal 64 of a thermal time delay relay 65. A first capacitor 66 is connected between the center tap of transformer winding 57 and lead 41, and a second capacitor 67 is connected between lead 41 and the junction between inductors 61 and 62.

Terminal 64 of relay 65 is connected to a movable bimetallic arm 68 which engages a stationary contact 69 when heated to a predetermined temperature by a heating element 70. The end terminals of heating element 70 are connected to respective power terminals 17 and 18 of switch 16. Terminal 69 of relay 65 is connected to the anode 12 of discharge tube 10.

Closure of switch 16 results in voltage source 13 being applied to the primary winding of voltage regulating transformer 21. The output voltage of this transformer appearing between leads 33 and 35 is maintained at a constant value irrespective of minor fluctuations in the output of voltage source 13. The operation of transformer 21 to provide this constant voltage output is described in said Patent 2,143,745.

The output voltage of transformer 21 is applied to the primary winding 37 of transformer 38. The output voltage of transformer 38 is rectified by diodes 51 and 54, filtered by the unit including inductors 61 and 62 and capacitors 66 and 67, and applied across discharge tube 10. The voltage required to fire tube 10 initially may be of the order of several hundred volts whereas a voltage of less than one hundred volts is sufficient to maintain the discharge. The ratio of turns between transformer windings 37 and 40 is adjusted such that an output voltage of the required magnitude is provided across tube 10 to cause initial firing thereof. The purpose of time delay relay 65 is to prevent the application of voltage across tube 10 until cathode 11 is heated by filament 45 to its operating temperature. This prevents arcing between the cathode and anode of tube 10.

Once relay 65 is closed, the rectified voltage from transformer winding 40 is applied across tube 10 to cause a discharge to take place between the cathode and anode. This discharge results in the flow of considerable current through tube 10, which is followed at once by the generation of a self inductance in winding 40 of transformer 38. In the absence of current flow through transformer winding 40, there is substantially no flow of magnetic flux through air gap 31' because of the high reluctance through this path. However, the effect of the generated self inductance in winding 40 is to choke the magnetic flux tending to pass through winding 40 from primary winding 37. A portion of this magnetic flux is thereby shunted through air gap 31' so that the current flow through transformer winding 40 is limited and regulated. Under these conditions, ordinary minor fluctuations in the characteristic of discharge tube 10 are small in comparison with the reserve power capacity of transformer 38 so that the current flow through tube 10 remains constant as long as the voltage applied to the primary winding 37 of transformer 38 remains constant. The radiation from tube 10 is thus maintained at constant intensity.

In Figure 2 there is illustrated a second embodiment of the radiation source of this invention. Tube 10 is replaced by a gas filled discharge tube 75 of the cold cathode type. The voltage supply section of Figure 2 is identical to that of Figure 1 and corresponding elements are designated by like primed reference numerals. Transformer 21' and 38' are shown schematically. The voltage appearing between the end terminals of transformer winding 40' is applied across first opposite terminals 76 and 77 of a full wave rectifier bridge network 78. The first output terminal 79 of bridge network 78 is applied to the cathode 80 of tube 75. The second output terminal 82 of bridge network 78 is connected to the anode 83 of tube 75 through series connected inductors 61' and 62'. A first capacitor 66' is connected between terminal 82 and lead 81, and a second capacitor 67' is connected between lead 81 and the junction between inductors 61' and 62'.

The circuit shown in Figure 2 operates in substantially the same manner as the circuit of Figure 1. The output voltage from saturable reactor transformer 38' is rectified, filtered and applied across gas filled discharge tube 75 which provides the desired constant intensity radiation.

From the foregoing description it should be apparent that there is provided in accordance with this invention an improved source of radiation of constant intensity. This radiation is provided by passing a constant direct current through an electrical discharge device. The current is supplied from a saturable reactor type of voltage regulating transformer which has the property of applying a high firing voltage across the tube initially and maintaining a steady current thereafter to sustain the discharge. The output voltage from this transformer is rectified and filtered to maintain a steady direct current. This constant direct current results in radiation of constant intensity.

While this invention has been described in conjunction with present preferred embodiments thereof, it should be evident that the invention is not limited thereto.

What is claimed is:

1. A source of electromagnetic radiation comprising, in combination, a gas filled discharge tube having a cathode and an anode, a source of alternating voltage, a saturable reactor current limiting transformer having the input terminals thereof connected to the output terminals of said source of alternating voltage, and current rectifying means having the input terminals thereof connected to the output terminals of said transformer, the output terminals of said current rectifying means being connected to the cathode and anode of said discharge tube, respectively.

2. A source of electromagnetic radiation comprising, in combination, a gas filled discharge tube having a cathode and an anode, a source of alternating voltage, a voltage regulator having the input terminals thereof connected across said voltage source, a saturable reactor current limiting transformer having the input terminals thereof connected to the output terminals of said voltage regulator, current rectifying means having the input terminals thereof connected to the output terminals of said transformer, and current filter means having the input terminals thereof connected to the output terminals of said rectifying means, the output terminals of said current filter means being connected to the cathode and anode of said discharge tube, respectively.

3. The combination in accordance with claim 2 wherein said saturable reactor current limiting transformer comprises a loop of magnetic material, a primary winding mounted on said loop, a secondary winding mounted on said loop in spaced relation with said primary winding, and a mass of magnetic material extending substantially across said loop between said primary and secondary windings.

4. Apparatus for supplying direct current to a load device requiring a high starting voltage and having a resistance which varies inversely with current flowing therethrough comprising, in combination, a source of alternating voltage, a saturable reactor current limiting transformer having the input terminals thereof connected to the output terminals of said source of alternating voltage, and current rectifying means having the input terminals thereof connected to the output terminals of said transformer, the output terminals of said current rectifying means supplying said direct current.

5. Apparatus for supplying a constant direct current to a load device requiring a high starting voltage and having a resistance which varies inversely with current flowing therethrough comprising, in combination, a source of alternating voltage, a voltage regulator having the input terminals thereof connected across said voltage source, a saturable reactor current limiting transformer having the input terminal thereof connected to the output terminals of said voltage regulator, current rectifying means having the input terminals thereof connected to the output terminals of said transformer, and current filter means having the input terminals thereof connected to the output terminals of said rectifying means, the output terminals of said current filter means supplying said direct current.

6. A source of electromagnetic radiation comprising, in combination, a gas filled discharge tube having a cathode, an anode and a cathode heater filament, a source of alternating voltage, a voltage regulator, means including a switch connecting said source of alternating voltage to the input terminals of said voltage regulator, a saturable reactor current limiting transformer having the input terminals thereof connected to the output terminals of said voltage regulator, circuit means connecting the output terminals of said voltage regulator to the end terminals of said cathode heater filament, current rectifying means having the input terminals thereof connected to the output terminals of said transformer, current filter means having the input terminals thereof connected to the output terminals of said rectifying means, means including a time delay relay connecting the output terminals of said filter means to the anode and cathode of said discharge tube, respectively, and means energizing said relay at a predetermined time interval following closure of said switch.

7. The combination in accordance with claim 5 wherein said saturable reactor current limiting transformer comprises a loop of magnetic material, a primary winding mounted on said loop, a secondary winding mounted on said loop in spaced relation with said primary winding, and a mass of magnetic material extending substantially across said loop between said primary and secondary windings.

References Cited in the file of this patent

UNITED STATES PATENTS

| | | |
|---|---|---|
| 2,085,060 | Young | June 29, 1937 |
| 2,176,447 | Vilkormerson | Oct. 17, 1939 |
| 2,280,630 | Cisin | Apr. 21, 1942 |
| 2,757,318 | Noel et al. | July 31, 1956 |